Nov. 15, 1955 N. W. F. PHILLIPS ET AL 2,723,911
METHOD OF SEPARATING ALUMINUM FROM IMPURITIES
Filed Aug. 4, 1954
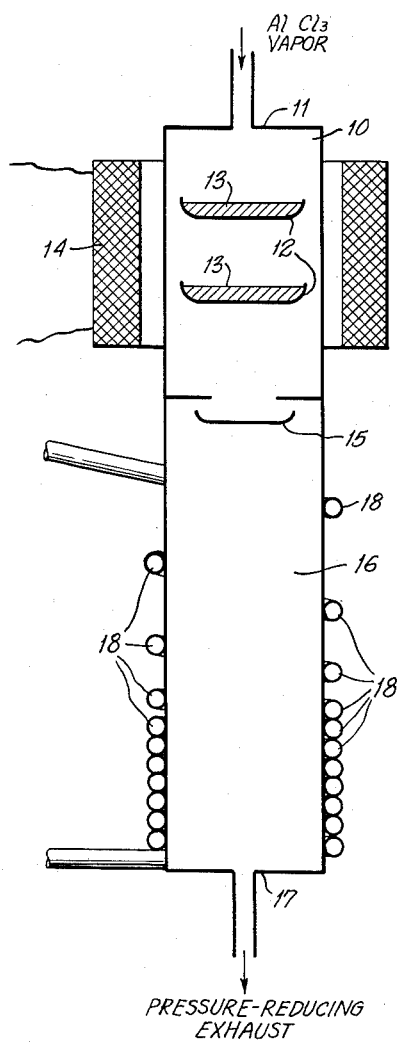
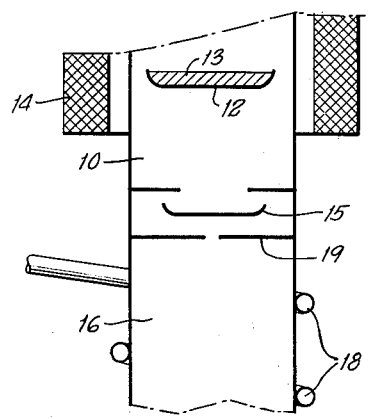
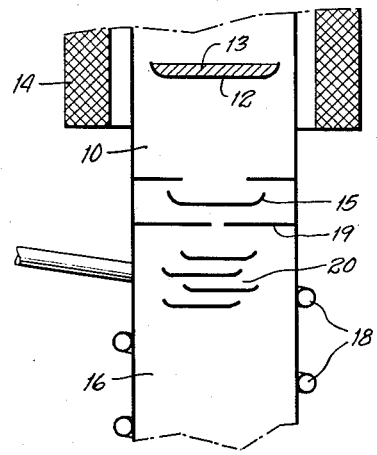
INVENTORS
NORMAN W.F. PHILLIPS
BRYAN RAPSON
BY ETHAN A. HOLLINSHEAD
Robert S. Dunham
ATTORNEY

United States Patent Office 2,723,911
Patented Nov. 15, 1955

2,723,911

METHOD OF SEPARATING ALUMINUM FROM IMPURITIES

Norman W. F. Phillips, Bryan Rapson, and Ethan A. Hollingshead, Arvida, Quebec, Canada, assignors to Aluminum Laboratories Limited, Montreal, Quebec, Canada, a corporation of Canada Application August 4, 1954, Serial No. 447,786

14 Claims. (Cl. 75—68)

Certain procedures for refining aluminum have involved the so-called catalytic distillation of that element from materials or compositions, for example alloys, which contain aluminum and other metals or elements. The present invention relates to such operations, which may also be specifically idenified as catalytic halide distillation methods (involving the distillation of aluminum as a subhalide), and is particularly directed to procedure that will afford a more effective separation of aluminum from impurities under circumstances where an appreciable amount of one or more other metals present may tend to distil with the aluminum.

In the catalytic halide distillation process as ordinarily contemplated, the aluminum-containing material is treated with a normal halide at an elevated temperature (yet below any point at which metallic aluminum would appreciably vaporize) so as to produce an aluminum-containing vapor which carries the aluminum in the form of a subhalide, for example usually the monohalide. The vapor from the reaction region, including the aluminum subhalide in gaseous form, is conducted to a condensing region where a reverse reaction takes place, i. e. at a suitably lower temperature than that of the initial reaction, with the result of reversion to aluminum, which is deposited, and normal aluminum halide, which may or may not be deposited, depending on its nature as determined or affected by the nature of the halide used in the original reaction. For example, aluminum trichloride will remain in vapor form at the lowest temperatures usually reached in condensing the aluminum, whereas if aluminum fluoride or cryolite has been used in the reactor, the re-established normal fluoride may be condensed along with the metallic aluminum, which is thereafter easily separated from the compound.

While the initial reaction between the aluminum-containing alloy or material and the halogen has been proposed in various ways (as by heating the alloy with a higher halide of aluminum or of another suitable metal, or even by direct treatment with halogen or halogen acid), a particularly effective procedure is to bring a halide vapor into contact with the highly heated aluminum-bearing composition. For example, a higher halide of aluminum, e. g. aluminum trichloride, can be passed in vaporized form through or over the alloy to be treated while keeping the latter heated to a suitable temperature, the alloy being preferably in a granular or like divided or other form having a relatively large surface area. Other halides, such as bromides and particularly fluorides (in simple form, or in complex salts such as cryolite), have been employed in operations of this sort, but the chlorides, which are efficient and peculiarly economical, are of preferred and special significance in the present invention. Iodides are in general not useful. Convenience and effectiveness are usually served by supplying the halide as the higher halide of aluminum, e. g. aluminum trichloride, although the halides of other metals, such as alkaline and alkaline earth metals, may sometimes be employed, as well as the complex halides.

In many cases of operation of this process, the nature of the impurities in the aluminum-bearing material, and the other conditions are such that essentially only aluminum is carried into the vapor phase, i. e. in subhalide form, with the result that a highly pure aluminum condensate is produced in the condensing region. As indicated, the condensing operation is understood to involve a reverse reaction, separating the aluminum from its subhalide form and re-establishing the higher halide of aluminum that was originally supplied and that can then be carried away, in vapor state, from the condensing region, or can otherwise be readily separated from the deposited metallic aluminum. As indicated below, however, there are a number of conditions or circumstances under which the deposited metal is still impure and to which the present invention is directed.

The invention will be described in connection with the catalytic distillation of aluminum using aluminum trichloride, which has been found to afford a particularly convenient procedure, but it will be understood that the same principles apply regardless of the nature of the normal halide used and are thus applicable, for instance, in the case of bromides and fluorides.

For correction of difficulties such as mentioned above, one important application of the invention has thus involved procedure wherein the aluminum-bearing material is treated with the vapor of aluminum trichloride at a suitably high temperature (say 1000° to 1200° C.), so as to produce, by reaction, a vapor containing aluminum monochloride. In the condensing zone, the reaction reverses, depositing metallic aluminum and permitting the vapor of aluminum trichloride to be carried away for re-use or other recovery. Under certain favorable conditions, relatively non-volatile impurities such as iron, silicon, titanium, manganese and the like, do not distil to an appreciable extent and an aluminum deposit of high purity is obtained.

It has been found, however, that under at least most conditions manganese (if present in the original alloy), and likewise many other component metals when present in substantial proportion (including iron, silicon, titanium and the like), may distil in considerable amount with the aluminum and thereby contaminate the product. That is to say, under most conditions at least some of these relatively non-volatile metals are sufficiently strong reducing agents, and have sufficient activity in the crude alloy, to reduce some aluminum chloride according to reactions of the general type

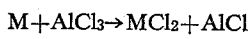

$$M + AlCl_3 \rightarrow MCl_2 + AlCl$$

thus forming a volatile halide of the contaminating metal (or metals). When the gases are cooled to deposit aluminum this reaction reverses, thus depositing the contaminating metal with the aluminum.

In accordance with the present invention, it has been discovered that the stated impurities may be effectively segregated by suitable control of the halide distillation process, and particularly by control of the condensation reactions, so as to yield a separated deposit of highly pure aluminum which represents a useful extent of recovery of such metal from the original alloy. More specifically it has now been found that at any temperature under equilibrium conditions of the reactions involved, and for each metallic impurity of the above type, the impurity-aluminum ratio in the free or condensed state is much greater than the corresponding ratio of substances in the combined (halide) or vapor form, so that by appropriate regulation of the course of a given operation, an effective segregation of the impurities can be obtained in the condensing region. That is to say, it has been experimentally determined that by maintaining a suitable temperature gradient in the region of the condensing reaction or reactions, it is possible to obtain at least two distinct and separable condensate fractions, the first being relatively rich in the impurity or impurities and the second consisting of aluminium substantially free of impurities.

In further explanation of the improved process, reference is first made to alloys contaminated with manganese, which seems to be susceptible of distillation in halide form with aluminum under a very wide variety of conditions. Regardless of the nature of metallic impurities, the following equation may be taken as representing the basic chloride-aluminum reactions:

$$AlCl_3(g) + 2Al(c) \rightleftharpoons 3AlCl(g) \quad (1)$$

Here and below, the subscript "g" refers to the gaseous state of a substance, and the subscript "c" to the metal in condensed or its original solid form. In the reactor where the aluminum is treated with gaseous aluminum trichloride at a high temperature (the aluminum being in a liquid or solid alloy state) the reaction proceeds from left to right in the above equation, yielding gaseous aluminum monochloride which passes to the condenser usually along with some unreacted trichloride. In the condenser the cooling of the gas effects the reverse reaction, from right to left, and deposits aluminum metal, leaving the trichloride vapor to be separately condensed, at a lower temperature, or recirculated. When manganese is present in the alloy, it tends to co-distil, the reactions being presumably as follows:

$$AlCl_3(g) + Mn(c) \rightleftharpoons MnCl_2(g) + AlCl(g) \quad (2)$$

As before, the forward reaction takes place in the first step and the reverse reaction under the cooling influence of the condensing region.

The relation between the activities of manganese chloride vapor and aluminum monochloride vapor and the activities of manganese and aluminum in the treated alloy or the condensed metal is, at equilibrium:

$$\frac{[MnCl_2]}{[AlCl]^2} = \frac{K_2[Mn]}{K_1[Al]^2} \quad (3)$$

It will be understood that $K_1$ and $K_2$ respectively represent the equilibrium constants for Reactions 1 and 2 above, while the several bracketed expressions denote activities of the substances or elements there expressed. The value of $K_2/K_1$ is considerably less than unity (indeed, having been estimated to be $\frac{1}{250}$ at 1000° C.) so that the manganese-aluminum ratio in the condensate is, or tends to be much greater than the corresponding ratio in the vapor. Accordingly, as condensation proceeds, the manganese content of the vapor is rapidly depleted and in the later stages the aluminum condenses without an appreciable manganese content. Pursuant to the present discovery as explained by these principles, the process of the invention involves conducting the vapor through a condensing region having a temperature gradient such that the condensing reaction provides a deposit of at least two distinct and separable fractions along the path of gas flow, the first fraction containing the bulk of the manganese distilled and the last being substantially manganese-free.

It will now be appreciated that the actual temperatures to be employed in the condenser will depend on the conditions of reaction, and can be easily determined in any case, in the light of the principles explained herein. For instance, one of the governing conditions that can be readily taken into account, is that of pressure; in general, the percent conversion varies with pressure in an inverse but determinable manner, at a given temperature. Each without any special provisions as mentioned below, there is some progressive pressure drop along the path of vapor from the reactor into and through the condenser, facilitating the use of a conveniently considerable temperature difference between the reactor and the more remote regions of the condenser. In any event, it has been found that the fractional separation or concentration here described, relative to aluminum and to manganese or other contaminating metals, can be very readily achieved in progressively cooler zones along the condensing region, without inconveniently critical control.

For instance, by maintaining a first or entering part of the condenser at a temperature only slightly below that of the reactor, and maintaining a further or remote part of the condenser at a substantially lower temperature, corresponding fractions of the transported metals are deposited. The entering or higher temperature region of the condenser should be of sufficient magnitude, lengthwise of the vapor path, to insure substantial deposition of manganese rich condensate yet insufficient to permit unnecessary or undue deposit of aluminum; it will be understood that the reaction to liberate metallic aluminum will also necessarily occur at this region, although to a relatively much smaller extent, as indicated by the relation of equilibrium constants explained above. In the further or cooler region of the condenser, i. e. cooler with respect to the manganese-condensing zone, aluminum of high purity is deposited. While some useful, specific examples of temperatures and other conditions are given below, other values can be employed within a wide range of variation in the light of the principles here explained, the conditions being readily selected, as they must be, to suit the requirements of practical efficiency and economy in each case.

As will also now be apparent from Equation 3 above, the manganese-aluminum ratio in the condensate, for any given manganese-aluminum ratio in the vapor, will be inversely proportional to the pressure of aluminum monochloride. It is thus found, and has been demonstrated, that lower pressures in the first condensing region tend to favor the segregation of manganese and increase the yield of manganese-free aluminum. In practice, such lower pressure is obtainable by interposing an orifice or other resistance to gas flow between the reacting vessel and the condenser. Pressure would, of course, have no effect in the case of an impurity which itself distilled in monohalide (as distinct from higher halide) form. In addition to manganese, a number of other impurities which may often be sought to be removed, e. g. iron, silicon and titanium, will customarily pass, when they distil by these reactions, in a halide form higher than the monohalide, so that greater ease in segregating them is likewise had by special provision for a pressure drop to the condensing region. It will be understood, however, that where an impurity distils as a monohalide, a pressure decrease does no harm, and will remain of benefit where another impurity, i. e. even though it is but one of several present, passes over in higher halide form.

While under some favorable conditions other nonvolatile impurities than manganese, i. e. metals such as iron, silicon, titanium and the like, if present, do not undergo the described type of reaction (hereinafter referred to as distillation in a dissociating halide form) to an appreciable extent, it has been found that in certain circumstances the proportion of such impurities transported by these reactions may be relatively considerable, causing objectionable contamination of the condensed product. For instance, such result may occur when the aluminum activity in the alloy is low, by reason of a low aluminum content. In other cases, the contaminating element or elements may form or tend to form a stable compound with aluminum and similarly reduce the aluminum activity in the alloy; iron is an outstanding example of an element which appears to behave in that way when it is present. Still other elements which may in at least some situations tend to distil catalytically with aluminum, are metals such as copper, chromium, and nickel.

The procedure of the invention is effective with respect to other impurities (as just mentioned) in the same way as for the separation of manganese. For instance in the case of a binary alloy of low aluminum content, e. g. an aluminum-silicon alloy, there may be an appreciable silicon content in the halide vapor at equilibrium at reaction temperature, but the silicon-aluminum ratio will be or will tend to be considerably lower in the vapor than it is in the original metal under treatment and in the metal which is initially deposited in the course of the condensing reactions; only in the metal first deposited will the silicon content tend to be the same as in the original alloy. Hence, as explained above with respect to manganese, the initial stages of condensation effect rapid depletion of the silicon content of the vapor, and by provision of the temperature gradient along the condensing region as also explained, a relatively silicon-rich metal is deposited at one locality, while substantially pure aluminum is separably deposited at a further zone of the condenser.

Similar results may be obtained where the aluminum activity of the alloy under treatment is reduced by a material such as iron, so that various impurities, including others as well as iron, tend to undergo the distillation and condensation reactions. That is to say, while the presence of iron or other non-volatile constituent that produces a marked reduction in the aluminum activity coefficient of the alloy may thus result in an appreciable concentration of various impurities in the vapor, it is again found that the impurity-aluminum ratio will be much lower in the vapor than it is in the metal which is first deposited in the course of the condensation reactions. In consequence by the same procedure, including the maintenance of successive zones of appropriate temperatures along the path of vapor in the condenser, the impurities may be substantially segregated in a first or preliminary zone, while the remainder of the condensate, at further localities of the condenser, is substantially pure aluminum.

Extended reference has been made in the foregoing to iron, silicon, titanium and manganese, since these are the chief metals which are difficultly separable from aluminum yet apt to be encountered in crude metal or alloy prepared more or less directly from aluminum ore such as bauxite. While the present procedure is thus advantageous for the treatment of so-called primary metal, it is also effective for separation of aluminum from secondary metals, i. e. scrap or other bodies of alloys or metal mixtures which may contain any of a variety of metals. By way of example, a number of further metals have also been named above, from which aluminum may be separated by the present process of fractional condensation from the volatile, dissociating halide state. It will be understood, of course, that in either primary or secondary alloys, the process is not essentially concerned with relatively volatile elements such as zinc, magnesium or the like, but relates to the class of metals which are not per se volatile at the temperatures here used. In general, the present improvement in catalytic distillation procedures is applicable to the separation of aluminum from one or more of the metals that have been named above, viz. from such metal which tends to form a volatile, dissociating halide and thus to pass over with the volatile, dissociating halide (specifically, subhalide) of aluminum; as explained, such contamination of the vapor may arise whenever, as by reason of the proportion or other condition or characteristic of the other metal, it has sufficient activity relative to aluminum in the mixture, to effectuate appreciable reduction of the aluminum trichloride or other supplied source of halide.

The following are specific examples of the present process, all carried out with an appropriate distillation apparatus having provision, as will now be understood, for treating the impure metal or alloy with aluminum trichloride vapor at a high temperature (as specified below), and at a suitable pressure, e. g. above about 5 mm. (of mercury), and usually preferably in the range of 5 to 50 mm. At pressures lower than a few millimeters the rate of metal removal may be too low for economical operation; ordinarily the pressure can be as high as is consonant with efficient supply of heat to the reactants in the specific equipment used, the required temperature being generally higher with greater pressure, for a given percent conversion. The apparatus also included a condensing section, receiving continuous flow of vapor from the reactor or reaction vessel, and having suitable cooling means (conveniently, a simple circulation of coolant around the condenser) arranged so that a considerable temperature gradient existed, between the entrance or entering end (warmed by conduction from the reactor) and more remote surfaces of the condensing path. For instance, such temperature gradient was usually about 500–600° C., e. g. ranging from about 1100–1200° C. at the condenser entrance to about 600° C. at the more remote regions.

By thus maintaining a substantial temperature difference, but in a graduated manner along the path of gas flow in the condenser, it was found that the impurity-rich fraction was essentially segregated somewhere at or near the entering zone, without requiring a very precise correlation between temperature and position along the condensing region. That is to say, by maintaining such gradient over a relatively considerable distance, there was necessarily some early region in which the impurity-rich fraction deposited, while certain further parts of the path then necessarily became occupied by deposit of essentially pure aluminum.

Referring to the drawing:

Fig. 1 is a diagrammatic view, as in vertical section, of an apparatus suitable for carrying out the process;

Fig. 2 is a fragmentary view, showing additional structure in the apparatus of Fig. 1; and Fig. 3 is another fragmentary view, showing further additional structure in the apparatus.

One convenient apparatus, as shown diagrammatically in the drawing, included an upper chamber or reactor 10 to which aluminum trichloride vapor was supplied at the top 11, and which contained means 12 for holding the crude alloy 13, there heated by induction heating, the heating means being diagrammatically indicated at 14. A trap 15, disposed to allow free vapor flow around it but to arrest any solids falling from the reactor, was interposed between the reactor 10 and the condenser chamber 16 below. The vapor thus flowed downwardly into the condenser 16 under the influence of an exhaust system (not shown) that was connected at the bottom 17 to remove spent vapor and to reduce the pressure of the entire enclosure to the desired sub-atmospheric values, e. g. the selected low pressure in the reactor 10, and correspondingly lower pressures in the condenser 16. As stated above, cooling means 18, e. g. for circulation of coolant around the condenser 16, is arranged so that a considerable temperature gradient exists between the entrance and lowermost part of the condenser 16.

In each of the following examples the apparatus employed consisted of a reactor and condenser aligned in a vertical manner such as shown diagrammatically in the drawing, the condenser being of upright cylindrical configuration with an internal diameter of 3 inches and an internal length, from the bottom of the trap 15 to the gas-exit end below, of about 12 inches. The reactor temperature in each case was measured by a thermocouple inserted in a central region of the reactor or the charge therein. No direct temperature measurements were made at the entrance or along the walls of the condenser, but the entering regions of the latter, e. g. the trap and the nearby wall structure, were heated by transfer of heat from the reactor and assumed temperatures not greatly below that of the reactor. At the very bottom of the condenser, where the aluminum trichloride vapor was withdrawn, the temperature was approximately 300° C. in all cases, so that the entirety of the condenser was kept above a point at which the aluminum trichloride would condense.

The precise gradient between the upper and lower ends of the condensing wall structure did not appear to be critical. In general the lower boundary of the lowest substantial thickness or deposit of condensed metal, e. g. the highly purified aluminum, was at least several inches (or more) above the condenser bottom, in all of these examples, and was thus at a region of somewhat higher temperature than such bottom. The temperature difference between, and the temperature conditions of the condenser entrance and the furthest regions where substantial metal condensation occurred, were thus believed to be approximately as indicated in the initial discussion of these examples hereinabove (preceding the description of drawings).

It may be noted that in a number of other tests, generally similar to these examples, a condenser which had an internal diameter of 8 inches and a length of 22 inches and which included some internal baffling, was successfully employed, i. e. in achieving segregation of impurities and of highly purified aluminum in respectively different portions or fractions of the reactively condensed metal.

Example I

Using aluminum trichloride vapor in apparatus of the character described, a granular aluminum-iron alloy mixed with 1% of metallic manganese was subjected to distillation by application of AlCl₃ vapor at a reactor temperature of 1100° C. and pressure of 40 mm. Condensate formed as metallic globules on the outside of the trap between the reactor and the condenser proper, this condensate fraction being found to comprise aluminum, but with a content of 0.21% manganese. A further deposit, in a partially fused, crystalline form, was obtained in the condenser proper, along a region in the upper half of the condenser wall beginning, say, about two or three inches from the top. This last-mentioned and thus specially separated fraction was found to contain only 0.04% manganese. Under the conditions of this operation (the original alloy containing 50%) iron), there was little or no iron transported and the second or manganese-poor fraction represented metallic aluminum of high purity.

Example II

Using the same apparatus for treatment of an aluminum-iron alloy containing 2.7% manganese with aluminum trichloride vapor at 1100° C. and at a pressure of 12 mm. in the reactor, a similar distillation was run. In this case the vapor path between the reactor and the condenser was obstructed, at a locality below the trap, with an orifice plate (as at 19 in Fig. 2) having an orifice 1/16 inch in diameter. An aluminum-containing deposit, consisting of metallic globules, was formed on the orifice plate, and was found to include 1.5% manganese. The major body of transported metal condensed on the walls of the condenser proper, at essentially the same region as the purified aluminum in Example I, and represented a separated, highly pure aluminum fraction containing only 0.06% manganese.

Example III

Using essentially the same apparatus, halide distillation was effected with respect to the residue (i. e. undistilled) alloy from Example II at 1100° C. and 8 mm., by applying aluminum trichloride vapor. In this case an orifice 1/4 inch in diameter was inserted in the vapor path between the reactor and the condenser, and in the interior of the condensing vessel, just below the orifice plate 19, there was disposed a stack of loosely fitting, silicon carbide dishes 20 (Fig. 3). Three separable fractions of distillate were formed, viz. (1) globules on the orifice plate, (2) globules on the dishes and on the condenser wall near the top or warmer (i. e. entering) end of the condenser, and (3) a crystalline deposit in a cooler or lower zone of the condenser, the last-mentioned deposit being at a locality beginning a few inches below the top but not extending below the middle of the condenser. These fractions consisted essentially of aluminum having manganese contents respectively of 1.1%, 0.015% and 0.014%.

Example IV

In this operation, distillation was carried out in the same fashion at 1100° C. (using aluminum trichloride vapor) upon an aluminum alloy containing 24% iron, 6% silicon, 4% titanium and 1% manganese, the balance being aluminum. No orifice plate or other supplemental devices were included in the path of vapor flow from the reactor to and through the condenser, although the latter was maintained with a temperature gradient as specified above, progressively cooler from its entering end to its more remote end. A brown deposit which formed at the hot end of the condenser (within an inch or two of the condenser wall immediately below the trap) was found to contain about 9% silicon and 13% manganese, while the main crystalline part of the distillate which formed in a cooler zone (along the upper part of the lower half of the condenser wall) contained 0.03% silicon and 0.1% manganese. While there was no appreciable segregation of iron or titanium, it will be seen that the process is useful to produce specific alloys of aluminum as well as pure aluminum. It will also be noted that the procedure afforded not merely a separation of a fraction rich in silicon and manganese, but actually a very substantial concentration of these elements in such fraction.

Example V

Using essentially the same apparatus and procedure as in Example IV a chloride distillation reaction was effected at 1200° C. upon an alloy containing about 16% aluminum, 23% Fe, 30% Si and 28% Ti. A fine crystalline deposit formed on the rim of the trap between the reactor and the condenser containing about 1.4% Fe, 40% Si and 0.6% Ti (the balance being aluminum), while the metallic distillate deposited in the condenser proper consisted of aluminum with approximate content of 0.03% Fe, 0.1% Si and 0.02% Ti. The last-mentioned fraction extended, approximately, from a locality of the condenser wall a few inches below the trap to a locality somewhat below the middle of the condenser.

Example VI

In this operation, apparatus was used as described in Example III above, except that the orifice at the entrance to the condenser was 1/8 inch in diameter. The distillation reaction, with aluminum trichloride vapor, was performed at 1200° C. and a pressure of 4 mm. in the reactor, upon an alloy containing about 35% Al, 60% Fe, 0.26% Si, 0.24% Ti and 3% Mn. One fraction of condensate consisted of globules forming on the dishes 20 (Fig. 3) at the hot or entering end of the condenser, while a separable fraction was provided by a crystalline deposit on the condenser wall in a cooler zone of the latter, i. e. in about the same region as the further fraction of Example IV hereinabove. The first fraction contained 0.18% Fe, 0.70% Si, 0.02% Ti and 0.06% Mn, while the second contained only 0.02% Fe, 0.01% Si, 0.005% Ti and 0.01% Mn, the balance in each case being aluminum.

By the methods of the invention, a very large proportion of the impurities may be removed in a relatively small fraction of the total distillate. The efficiency of the process in this respect has been indicated above, and is also quantitatively demonstrated by the following further examples of experimental operations.

Example VII

In an apparatus essentially similar to that used in Examples I to VI a distillation reaction (with aluminum trichloride vapor) was performed at 1400° C. in the reactor and 20 mm. pressure (i. e., the mean pressure at the top or vapor inlet end of the reactor), upon an alloy containing about 52% Al, 38% Fe, 5% Si, 4% Ti, and 0.06% Mn. The reactor was separated from the condenser by a plate 19 (Fig. 2) having an orifice 5/32 inch in diameter. One fraction of condensate was obtained at the hot end of the condenser and one at the cold end, i. e. respectively at a condenser wall region beginning about two or three inches below the trap and at a further wall region extending below the first and generally located in the uppermost portion of the lower half of the condenser. A comparison of these fractions is given in the following table:

| Condensate at— | Weight | Percent Si | Percent Mn | Percent of total Si | Percent of total Mn | Percent of total Al |
| --- | --- | --- | --- | --- | --- | --- |
| Hot Zone | 4.7 | 0.53 | 0.06 | 70 | 50 | 15 |
| Cold Zone | 26.7 | 0.04 | 0.01 | 30 | 50 | 85 |

It will be seen that the main precipitate constituting 85% of the distillate contained only 0.04% Si and 0.01% Mn and that 70% of the total Si and 50% of the total Mn distilled were segregated in the small (15%), separately condensed fraction.

*Example VIII*

In the same apparatus a like chloride distillation reaction was performed with a reactor temperature of 1200° C. and a pressure of 20 mm. (as in other cases, at the top of the reactor), upon an alloy containing about 47% Al, 28% Fe, 18% Si, 5% Ti and 0.8% Mn. The vapor passed from the reactor to the condenser through an orifice 1/8 inch in diameter (at 19, Fig. 2). One small fraction of condensate was obtained from the hot condensation zone and another, large fraction from the cold condensation zone. The first fraction was located substantially as the first fraction in Example IV, while the second fraction was taken from substantially the same region as the second fraction of Example V. Details of the condensates were:

| Condensate at— | Weight, g. | Percent Si | Percent Fe | Percent Ti | Percent of total Si | Percent of total Fe | Percent of total Ti | Percent of total Al |
| --- | --- | --- | --- | --- | --- | --- | --- | --- |
| Hot Zone | 0.3 | 9.0 | 3.0 | 0.2 | 73 | 53 | 33 | 1 |
| Cold Zone | 33 | 0.03 | 0.025 | 0.004 | 27 | 47 | 67 | 99 |

The table clearly shows that the major aluminum condensate, which contained 99% of the total amount distilled, was of high purity and that most of the impurities which distilled were deposited in the very small fraction at the hot zone.

It will be understood that the locations of the various portions or fractions of metallic deposit in the above examples are stated approximately, since there was no use of or need for a critically precise temperature control and the condensate locations might vary a little upon repeating any given example. In all cases, however, the experience was that a desirable segregation or classification occurred without difficulty, so long as a substantial temperature drop was maintained between (1) the entering end of the condenser and (2) the remote end or a region a few inches above the remote end.

It will now be seen that the described operations afford the production of highly purified aluminum, from alloys or other impure compositions, under circumstances where transport or distillation of one or more impurities might otherwise be expected. The procedure is essentially simple, involving the maintenance of a suitable temperature gradient in the condenser and corresponding segregation of the distillate into impurity-rich and highly purified fractions. As explained above and as apparent from Examples II, III and VI, the results were enhanced by providing a definite pressure drop between the reactor and the condenser, to the extent of reducing the impurity content of the ultimate condensate to less than 0.1%, and indeed to only a minor fraction of 0.1% of each impurity. While as explained above, the operations are peculiarly effective and economical in distillation (according to the invention) by treatment with aluminum trichloride vapor, the process is also applicable to like distillation effected with other halides and with halides of other metals as the source of halogen for reaction with aluminum to yield a vaporized aluminum subhalide.

This application is a continuation-in-part of our co-pending application Serial Number 188,066, filed October 2, 1950, now abandoned, for Separation of Aluminum From Impurities.

It is to be understood that the invention is not limited to the specific procedures herein described but may be carried out in other ways without departure from its spirit.

We claim:

1. A process for separation of aluminum from material that contains aluminum adapted for conversion to a volatile subhalide form by reaction with halide, and that contains another metal which is selected from the class consisting of manganese, iron, silicon, titanium, copper, chromium and nickel, and which is adapted to distil in dissociating halide form along with aluminum when the latter is converted to volatile subhalide form, comprising: reacting the material with halide at a temperature of at least about 1000° C. to produce a gaseous mixture containing aluminum subhalide and said other metal in volatile, dissociating halide form, conducting said gaseous mixture through a condensing region for causing reactive condensation of metallic material by decomposition of said dissociating halides, effecting said reactive condensation of metallic material as condensate fractions deposited at successive zones along the path of the gaseous mixture through said region and containing metallic aluminum and respectively decreasing proportions of said other metal by maintaining said zones in the region at corresponding successively lower temperatures along said path, the temperature of the first zone being maintained at a value, below the aforesaid reaction temperature, for initiating substantial reactive condensation and deposit of said other metal and the temperature of the condensing region through the remainder of the said path being maintained below that of the first zone for effecting reactive condensation and deposit of metal comprising a substantial part of the aluminum carried in the aforesaid subhalide form, so as to constitute a first condensate fraction at the said first zone and at least one further condensate fraction beyond said first zone, and recovering said last-mentioned condensate fractions separate from each other.

2. In a process for separation of aluminum from material containing aluminum and another metal selected from the class consisting of manganese, iron, silicon, titanium, copper, chromium and nickel, wherein there is produced a dissociating halide vapor comprising aluminum subhalide and said other metal in dissociating halide form, by reaction at a temperature of at least about 1000° C., the procedure which comprises: establishing said vapor at said temperature of at least about 1000° C., conducting said vapor through a condensing region for causing reactive condensation and deposit of metallic material by decomposition of said halides, effecting said deposit of metallic material as condensate fractions that occur at successive zones along said region and that contain respectively decreasing proportions of said other metal and increasing proportions of aluminum, by maintaining said zones in the region at corresponding successively lower temperatures below the temperature of the vapor established as aforesaid, the temperature of the first zone being maintained at a value for initiating substantial reactive condensation and deposit of said other metal, to provide the first condensate fraction, and the temperature of the last of said zones being maintained at a substantially lower temperature to provide reactive condensation and deposit of aluminum-containing material which contains a substantially smaller proportion of said other metal than said first fraction, and recovering the condensate fractions at said first and last zones separate from each other.

3. A process as recited in claim 2 in which the other metal is manganese.

4. A process as recited in claim 2 in which the other metal is iron.

5. A process as recited in claim 2 in which the other metal is silicon.

6. A process as recited in claim 2 in which the other metal is titanium.

7. A process as recited in claim 2 which includes reducing the pressure of the said halide vapor while conducting it into the conducting region, and maintaining the vapor at said reduced pressure while it traverses said region.

8. In a process for separation of aluminum from material containing aluminum and another metal selected from the class consisting of manganese, iron, silicon, titanium, copper, chromium and nickel, wherein said material is reacted with chloride at a temperature of at least about 1000° C. to produce dissociating chloride vapor comprising aluminum subchloride and said other metal in dissociating chloride form, the procedure which comprises: establishing said vapor at said temperature of at least about 1000° C., conducting said vapor through a region for condensing and depositing metallic material by decomposition of said dissociating chlorides, including condensing at a first zone of said region a condensate fraction relatively rich in said other metal and at a further zone of said region, a condensate fraction containing aluminum and relatively poor in said other metal, by maintaining the said first zone of the region at a temperature, below the aforesaid established temperature of the vapor, for initiating substantial condensation of said other metal by decomposition of its aforesaid dissociating chloride, and maintaining the temperature of said further zone at a value substantially below the temperature of the first zone, for condensing metallic aluminum from the said vapor by decomposition of said aluminum subchloride, and recovering said condensate fractions separate from each other.

9. A process as recited in claim 8 in which the step of establishing the dissociating chloride vapor comprises treating the aforesaid material with aluminum trichloride vapor at a selected temperature of about 1100° to 1400° C. to produce a vapor including aluminum monochloride.

10. A process as recited in claim 8 in which the contaminating material is manganese.

11. A process as recited in claim 8 in which the contaminating material is iron.

12. A process as recited in claim 8 in which the contaminating material is silicon.

13. A process as recited in claim 8 in which the contaminating material is titanium.

14. A process for separation of aluminum from material that contains aluminum adapted for conversion to volatile monochloride form by reaction with aluminum trichloride and that contains manganese adapted to distil in dissociating chloride form along with aluminum when the latter is converted to said monochloride, comprising: reacting the material with aluminum trichloride at a selected temperature of about 1100° to 1200° C. to produce a gaseous mixture containing aluminum monochloride and manganese in volatile, dissociating chloride form, conducting said gaseous mixture through a condensing region for causing reactive condensation of metallic material by decomposition of said dissociating chlorides, effecting said reactive condensation of metallic material as condensate fractions deposited at successive zones along the path of the gaseous mixture through said region and containing metallic aluminum and respectively decreasing proportions of manganese, by maintaining said zones in the region at corresponding successively lower temperatures along said path, the temperature of the first zone being maintained at a value slightly below the aforesaid temperature of reaction, for initiating substantial reactive condensation and deposit of manganese and the temperature of the remainder of the condensing region being maintained at a temperature decreasing to a value, at the end of said path, of about 500° to 600° C. below the temperature of said first zone, for effecting reactive condensation and deposit of metal comprising a substantial part of the aluminum carried as the aforesaid monochloride, so as to constitute a first condensate fraction at the said first zone and at least one further condensate fraction beyond said first zone, and recovering said last-mentioned condensate fractions separate from each other.

References Cited in the file of this patent

UNITED STATES PATENTS

| 2,184,705 | Willmore | Dec. 26, 1939 |
| 2,236,234 | Hanak | Mar. 25, 1941 |
| 2,607,675 | Gross | Aug. 19, 1952 |

FOREIGN PATENTS

| 582,579 | Great Britain | Nov. 21, 1946 |